US009007628B2

(12) United States Patent  
Ichikawa (10) Patent No.: US 9,007,628 B2  
(45) Date of Patent: Apr. 14, 2015

(54) IMAGE PROCESSING DEVICE CONFIGURED TO REACQUIRE DATA BASED ON REFERENCE INFORMATION

(75) Inventor: Kazuki Ichikawa, Gamagori (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 178 days.

(21) Appl. No.: 13/528,694

(22) Filed: Jun. 20, 2012

(65) Prior Publication Data

US 2013/0050737 A1     Feb. 28, 2013

(30) Foreign Application Priority Data

Aug. 31, 2011 (JP) ................................. 2011-188797

(51) Int. Cl.  
*G06F 3/12*   (2006.01)  
*G06K 15/00*  (2006.01)  
*G06F 15/173* (2006.01)

(52) U.S. Cl.  
CPC ............ *G06F 3/1206* (2013.01); *G06F 3/1265* (2013.01); *G06F 3/1285* (2013.01); *G06F 3/121* (2013.01); *G06F 3/1258* (2013.01)

(58) Field of Classification Search  
CPC ... G06F 3/1206; G06F 3/1265; G06F 3/1285; G06F 3/121; G06F 3/1258; H04L 29/0809; H04L 29/08594  
USPC .................. 358/1.15; 709/224, 225; 715/769; 725/105  
See application file for complete search history.

(56) References Cited

U.S. PATENT DOCUMENTS

| | | | | |
|---|---|---|---|---|
| 6,594,697 B1* | 7/2003 | Praitis et al. | | 709/225 |
| 6,601,098 B1* | 7/2003 | Case et al. | | 709/224 |
| 6,611,835 B1* | 8/2003 | Huang et al. | | 1/1 |
| 6,928,620 B1* | 8/2005 | Crangle et al. | | 715/769 |
| 6,981,210 B2* | 12/2005 | Peters et al. | | 715/234 |
| 7,339,695 B2* | 3/2008 | Mitsubori | | 358/1.15 |
| 7,990,847 B1* | 8/2011 | Leroy et al. | | 370/216 |
| 8,294,927 B2* | 10/2012 | Kunori | | 358/1.15 |
| 2001/0025313 A1* | 9/2001 | Feng et al. | | 709/226 |
| 2002/0052928 A1* | 5/2002 | Stern et al. | | 709/218 |
| 2004/0049579 A1* | 3/2004 | Ims et al. | | 709/225 |

(Continued)

FOREIGN PATENT DOCUMENTS

| | | | |
|---|---|---|---|
| JP | 2001-184180 A | 7/2001 | |
| JP | 2004-062573 A | 2/2004 | |

(Continued)

OTHER PUBLICATIONS

Office Action issued in related Japanese Patent Application No. 2011-188797, mailed Feb. 10, 2015.

*Primary Examiner* — Fred Guillermety  
*Assistant Examiner* — Walter Yehl  
(74) *Attorney, Agent, or Firm* — Merchant & Gould PC (57) ABSTRACT

An image processing device includes an acquiring section, a determining section, a storage section, and a reacquiring section. The acquiring section is configured to acquire data based on reference information indicative of a reference location on a network. The determining section is configured to determine whether the acquiring section succeeds or fails in acquisition of the data. The storage section is configured to store the reference information when the determining section determines that the acquiring section fails in acquisition of the data. The reacquiring section is configured to reacquire data based on the reference information stored in the storage section.

14 Claims, 7 Drawing Sheets (56) References Cited

U.S. PATENT DOCUMENTS

| | | |
|---|---|---|
| 2004/0051900 A1 | 3/2004 | Sagiya et al. |
| 2005/0114766 A1 | 5/2005 | Yamamoto |
| 2006/0041827 A1* | 2/2006 | Yamaoka et al. ............. 715/500 |
| 2006/0253454 A1* | 11/2006 | Coppola et al. ................. 707/10 |
| 2007/0058196 A1 | 3/2007 | Nagahara et al. |
| 2007/0139698 A1 | 6/2007 | Sato |
| 2011/0072129 A1* | 3/2011 | Le Pennec et al. ........... 709/224 |
| 2013/0050737 A1* | 2/2013 | Ichikawa ..................... 358/1.14 |
| 2013/0083348 A1* | 4/2013 | Yamada ....................... 358/1.14 |

FOREIGN PATENT DOCUMENTS

| | | |
|---|---|---|
| JP | 2004-112182 A | 4/2004 |
| JP | 2004-153688 A | 5/2004 |
| JP | 2005-159449 A | 6/2005 |
| JP | 2007-109212 A | 4/2007 |
| JP | 2007-156713 A | 6/2007 |
| JP | 2007-304837 A | 11/2007 |
| JP | 2008-269159 A | 11/2008 |

* cited by examiner

IMAGE PROCESSING DEVICE CONFIGURED TO REACQUIRE DATA BASED ON REFERENCE INFORMATION

CROSS REFERENCE TO RELATED APPLICATIONS

This application claims priority from Japanese Patent Application No. 2011-188797 filed Aug. 31, 2011. The entire content of the priority application is incorporated herein by reference.

TECHNICAL FIELD

The invention relates to an image processing device, an image processing system, and a printing device.

BACKGROUND

A printing device is conventionally known that acquires reference information of data, that acquires the data from a reference location indicated by the reference information, and that performs printing. For example, a printing device is conventionally known that acquires URL information for referring to a Web page, that acquires print data (contents) from the Web page at a reference location indicated by the URL information, and that performs printing.

SUMMARY

However, when the printing device fails in acquisition of data from a Web page, a user needs to acquire URL information (reference information) and to, again, instruct acquisition of data from the Web page indicated by the URL information for printing. Otherwise, the data cannot be acquired from the Web page.

In view of the foregoing, it is an object of the invention to provide an image processing device, an image processing system, and a printing device that can acquire data from a reference location appropriately.

In order to attain the above and other objects, the invention provides an image processing device. The image processing device includes an acquiring section, a determining section, a storage section, and a reacquiring section. The acquiring section is configured to acquire data based on reference information indicative of a reference location on a network. The determining section is configured to determine whether the acquiring section succeeds or fails in acquisition of the data. The storage section is configured to store the reference information when the determining section determines that the acquiring section fails in acquisition of the data. The reacquiring section is configured to reacquire data based on the reference information stored in the storage section.

According to another aspect, the invention also provides an image processing system. The image processing system includes an acquiring section, a determining section, a storage section, and a reacquiring section. The acquiring section is configured to acquire data based on reference information indicative of a reference location on a network. The determining section is configured to determine whether the acquiring section succeeds or fails in acquisition of the data. The storage section is configured to store the reference information when the determining section determines that the acquiring section fails in acquisition of the data. The reacquiring section is configured to reacquire data based on the reference information stored in the storage section.

According to still another aspect, the invention also provides a printing device. The printing device includes a processor, a network interface, a memory storing a set of program instructions executable by the processor, and an image forming section. The network interface is connectable to a network. The set of program instructions includes acquiring data based on reference information indicative of a reference location on the network, determining whether acquisition of the data succeeds or fails, storing the reference information in the memory when acquisition of the data fails, and reacquiring data based on the reference information stored in the memory. The image forming section is configured to print either the data acquired in the instructions for acquiring data or the data reacquired in the instructions for reacquiring data.

BRIEF DESCRIPTION OF THE DRAWINGS

Embodiments in accordance with the invention will be described in detail with reference to the following figures wherein.

DETAILED DESCRIPTION

First Embodiment

A printer embodying an image processing device and a printing device according to a first embodiment of the invention will be described while referring to FIGS. 1 through 3. In the present embodiment, the invention is applied to a printer having a function of acquiring print data from a Web page and of performing printing.

[Configuration of Printer]

Figure 1:
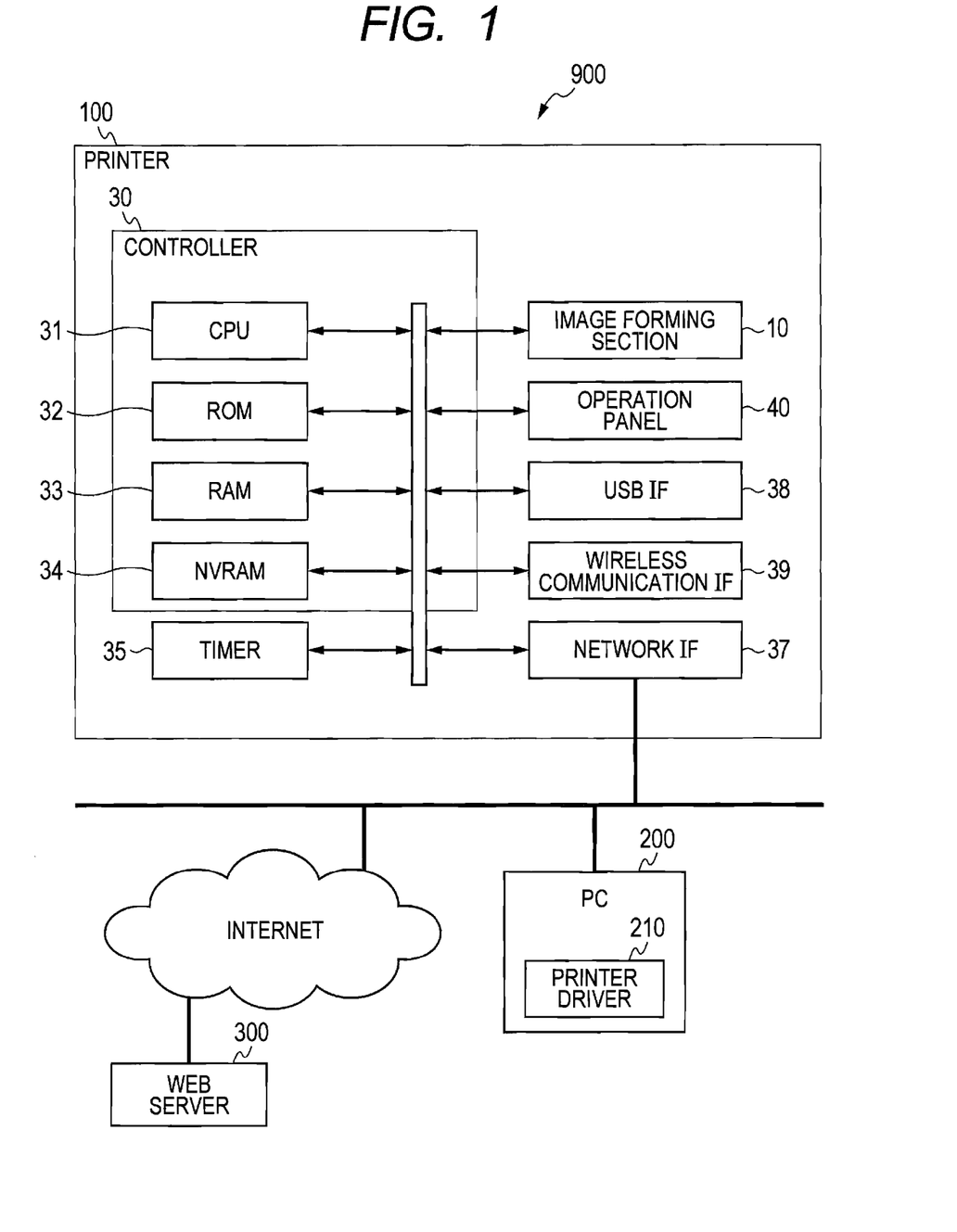
FIG. 1 is a block diagram showing the electrical configuration of a printer according to a first embodiment of the invention.
Figure 2:
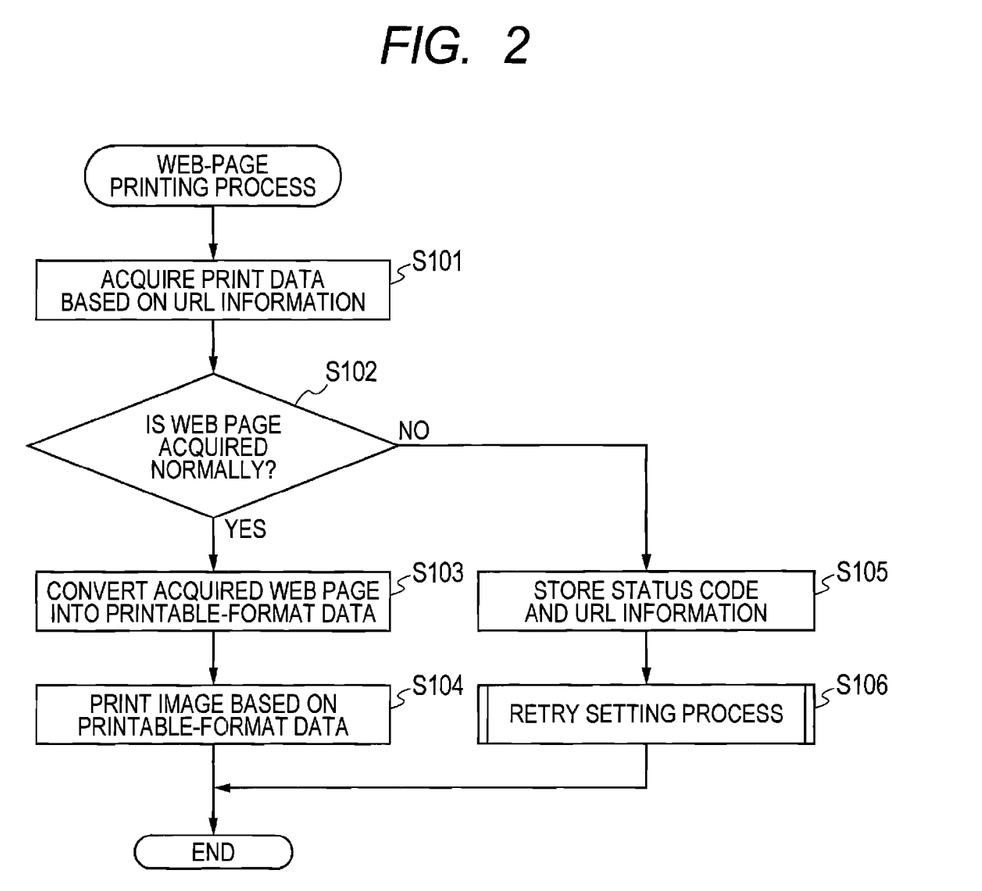
FIG. 2 is a flowchart showing steps in a Web-page printing process.

As shown in FIG. 1, a printer 100 (an example of an image processing device and a printing device) of the present embodiment includes a controller 30 having a CPU 31, a ROM 32, a RAM 33, and an NVRAM (Non Volatile RAM) 34. The controller 30 is electrically connected with an image forming section 10 that prints an image on paper, an operation panel 40 that displays operating conditions and that receives input operations by a user, a network interface 37, a USB interface 38, a wireless communication interface 39, and a timer 35 for measuring time.

The ROM 32 stores firmware, various settings, initial values, and the like. The firmware is a control program for controlling the printer 100. The RAM 33 and the NVRAM 34 are used as a work area to which various control programs are read out, or as a storage area for storing print data temporarily. The NVRAM 34 (an example of a storage section) is also used as a storage area for storing various settings that are set by a user after shipment.

The CPU 31 (an example of an acquiring section, a determining section, a reacquiring section, a reason determining section, a setting section, a detecting section, and a speed determining section) controls each element of the printer 100 while storing its processing results in the RAM 33 or in the NVRAM 34 in accordance with control programs read out from the ROM 32 and signals sent from various sensors.

The network interface 37 and the USB interface 38 are interfaces that enable communication with other devices. The printer 100 receives data sent from the other devices via these interfaces.

In the present embodiment, the printer 100 performs communication, via the network interface 37, with a personal computer (PC) 200 in which a printer driver 210 for the printer 100 is installed and with a Web server 300 storing a Web page. The printer 100, together with the PC 200 and a communication device such as the Web server 300, constitutes a printing system 900.

In addition, other devices may be used via the USB interface 38. For example, if a flash memory is connected to the USB interface 38, the flash memory can be used as a storage area. Further, if a keyboard is connected, the keyboard can be used to perform input operations.

The image forming section 10 prints an image on paper. Here, a type of forming images may be an electro photographic type or an inkjet type. Further, the image forming section 10 may be for color printing or only for monochromatic printing.

The operation panel 40 has various buttons for receiving user inputs and a touch-panel screen for displaying text information, buttons, and the like. The various buttons include, for example, an OK button for starting a print operation, a cancel button for cancelling a print operation, and character buttons for a user to input URL of a Web page.

[Control by Printer]

Next, controls by the printer 100 will be described. The printer 100 of the first embodiment has a Web-page printing function of acquiring URL information (Uniform Resource Locator information) for referring to a Web page, acquiring print data (contents) from the Web page based on the URL information, and printing the contents.

When performing Web page printing, first, a user operates the operation panel 40 to input an instruction for executing Web page printing. Upon receiving the instruction, the printer 100 displays an input screen for prompting the user to input URL information. The user inputs the URL information of a Web page on the input screen. For example, in order to print information of a Web page stored in a certain directory of the Web server 300 (see FIG. 1), the user inputs URL information including the directory path. Then, the user presses the OK button on the operation panel 40.

When the OK button is pressed, the printer 100 temporarily stores inputted URL information in the RAM 33, accesses the directory of the Web server 300 based on the URL information, and downloads print data into the memory area (the RAM 33 or the NVRAM 34). Then, the printer 100 performs printing of downloaded print data. Note that, when the print data are printed, the printer 100 erases temporarily stored URL information from the RAM 33.

However, print data cannot always be downloaded to the memory area by accessing the directory of the Web server 300. Hence, the printer 100 determines whether print data are downloaded normally or not. And, if the print data cannot be downloaded normally, the printer 100 stores, in the memory area, both a status code generated when the print data cannot be downloaded normally and the inputted URL information of the Web page.

Then, the printer 100 analyzes the status code stored in the memory area. After that, the printer 100 sets a time to access the directory of the Web server 300, a time interval of accesses, or the like (hereinafter referred to as "retry setting") using the URL information of the Web page stored in the memory area. After that, the printer 100 accesses the directory of the Web server 300 in accordance with the retry setting (hereinafter referred to as "retry", an example of a reacquiring section).

[Status Code]

(1) Status Code Obtained When Downloading is Performed Normally

Specifically, the printer 100 determines that print data are downloaded normally if the printer 100 receives the status codes listed below as a response of a request for downloading the print data to the memory area of the printer 100.

200: OK

206: Partial Content

A status code of "200: OK" indicates that a request is completed. If the status code of "200: OK" is received, the printer 100 determines that print data are downloaded normally. Further, if print data are downloaded separately, or the like, the printer 100 receives a status code of "206: Partial Content". Hence, the printer 100 determines that the print data are downloaded normally.

(2) Status Code Obtained When Downloading is Not Performed Normally

On the other hand, the printer 100 determines that print data are not downloaded normally if the printer 100 receives the status codes listed below as a response of a request for downloading the print data to the memory area of the printer 100.

1XX: Continuing processing in response to a request

3XX: Additional processing is needed for completing a request

4XX: Inappropriate request from a client

5XX: Server error

Note that the above-listed status codes are merely an example and other status codes may be used. Further, characters "X" are to be substituted with numbers of 0 through 9. Additionally, because status codes of "2XX" other than "200" and "206" are not a response to a request for downloading print data to the memory area of the printer 100, the printer 100 may determine that print data are not downloaded normally.

Further, in the present embodiment, the status codes listed below are used to describe a case in which print data are not downloaded normally.

301: Moved Permanently

302: Found

303: See Other

307: Temporary Redirect

403: Forbidden

404: Not Found

408: Request Timeout

503: Service Unavailable (3) Status Code by Which Retry can be Performed Instantaneously If the printer 100 receives status codes of "301: Moved Permanently", "302: Found", "303: See Other", and "307: Temporary Redirect", it is likely that, although the printer 100 has accessed a directory of the Web server 300 based on the inputted URL information, there are no print data in the directory. In this case, the printer 100 received information from the Web server 300, and this information sometimes includes URL information indicating a moved location of the print data. If the URL information indicating the moved location of the print data is included, the printer 100 temporarily stores the URL information indicating the moved location in the RAM 33. After that the printer 100 accesses a directory of the moved location, and downloads the print data to the memory area of the printer 100. Thus, retry setting is so performed that the printer 100 accesses the directory of the Web server 300 based on the URL information indicating the moved location of the print data. Here, retry may be performed instantaneously after retry is set, because it is unlikely that a status code similar to the previously-received status code is received.

(4) Status Code by Which Retry can be Performed in a Short Time

If the printer 100 receives a status code of "503: Service Unavailable", it is likely that a load on the Web server 300 is high (i.e. a busy state) or that the Web server 300 is temporarily unavailable due to maintenance of the Web server 300. Thus, unless the printer 100 is provided with a time interval before retry is performed, the printer 100 will get a status code similar to the previously-received status code. So that retry is inefficient. Hence, the printer 100 performs retry after a time interval is provided prior to the retry.

(5) Status Code by Which a Long Time is Required Prior to Retry

On the other hand, if the printer 100 receives a status code of "403: Forbidden" or "404: Not Found", it is likely that an access right is set erroneously at the Web server 300, or the like. In this case, it is expected that it takes time of approximately one hour or longer, considering time in which an administrator of the Web server 300 receives notification and corrects the settings. Thus, unless the printer 100 is provided with a time interval before retry is performed, the printer 100 will get a status code similar to the previously-received status code. So that retry is inefficient.

Further, when the printer 100 receives a status code of "403: Forbidden" or "404: Not Found", a time to return from such a status tends to be longer than a case in which the printer 100 receives a status code of "503: Service Unavailable". Thus, a time interval prior to retry in the case of the status code of "403: Forbidden" or "404: Not Found" is set to a longer value than in the case of the status code of "503: Service Unavailable". That is, by appropriately setting a time interval prior to retry, print data can be downloaded to the memory area of the printer 100.

(6) Status Code Associated with Transmission Speed

If the printer 100 receives a status code "408: Request Timeout", it is likely that timeout occurs at a server that is waiting for a request from a client. It is also likely that transmission speed (communication speed) has dropped because there are many accesses to the Web server 300. In this case, even if the printer 100 has a time interval prior to retry, the printer 100 might have a similar status code. As the transmission speed gets faster, the printer 100 might not have a similar status code. Thus, the printer 100 checks the transmission speed. When the transmission speed becomes a predetermined transmission speed or higher, the printer 100 can download that print data to the memory area of the printer 100.

[Web-Page Printing Process]

Next, a Web-page printing process for implementing the above-described Web page printing function will be described while referring to the flowchart of FIG. 2. The CPU 31 starts the Web-page printing process when the OK button is pressed after URL information is inputted (as a trigger).

In the Web-page printing process, first, the CPU 31 reads out and acquires URL information that is inputted by a user and temporarily stored in the RAM 33, and acquires print data based on the URL information (S101, an example of an acquiring section). That is, the CPU 31 accesses a Web page at a reference location included in the URL information and the CPU 31 downloads the print data.

Next, the CPU 31 determines whether the Web page is acquired normally or not (S102, an example of a determining section). This determination in S102 is performed by determining whether the print data are stored in the RAM 33 and whether the printer 100 receives a status code of "200: OK" or "206: Partial Content".

If the CPU 31 determines that the Web page is acquired normally (S102: Yes), the CPU 31 converts the print data stored in the RAM 33 into printable-format data such as bitmap data (S103). After that the CPU 31 controls the image forming section 10 to print an image on paper based on the printable-format data (S104), and ends the Web-page printing process.

On the other hand, if the CPU 31 determines that the Web page is not acquired normally (S102: No), that is, if a status code other than "200: OK" or "206: Partial Content" is received, the CPU 31 stores, in the NVRAM 34, the status code that is temporarily stored in the RAM 33 and the inputted URL information (S105, an example of a receiving section). Then, the CPU 31 executes a retry setting process (S106) and ends the Web-page printing process. After the URL information and the like are stored in the NVRAM 34, the CPU 31 can erase the URL information and the like from the RAM 33.

Note that, subsequent to execution of the retry setting process, the CPU 31 executes retry in accordance with retry setting in a process separate from the Web-page printing process. Alternately, the CPU 31 may execute retry in accordance with retry setting in the Web-page printing process (an example of a reacquiring section).

[Retry Setting Process]

Next, the retry setting process (an example of a reason determining section and a setting section) of S106 in the Web-page printing process will be described while referring to the flowchart of FIG. 3.

When the printer 100 fails in downloading print data based on inputted URL information, it is troublesome for a user to input the URL information again. Further, the user does not know the reason of failure in downloading. Thus, even if the user input the URL information again, the printer 100 may fail in downloading repeatedly. Hence, it is difficult to download print data at appropriate timing. Thus, the printer 100 executes the retry setting process, thereby setting timing of retry.

In the retry setting process, first, the CPU 31 acquires a status code from the NVRAM 34 (S201), and determines whether there is URL information indicating a moved location of print data or not (S202, an example of the reason determining section and a status-code determining section). This determination in S202 is performed by determining whether the printer 100 receives a status code of "301: Moved Permanently", "302: Found", "303: See Other", or "307: Temporary Redirect".

If the CPU 31 determines that there is URL information indicating a moved location of print data (S202: Yes), the CPU 31 refers to the URL information indicating the moved location and sets retry such that retry is performed instantaneously (S206, an example of a setting section), and ends the retry setting process.

Here, reception of a status code does not necessarily mean a problem at the Web server 300, the transmission speed, or the like. For example, some status codes include URL of a moved location as described above. In this case, even if a control for resolving a trouble at the Web server 300 is performed, for example, a control suitable for the status code cannot be performed. Thus, when the status code includes URL of a moved location, the printer 100 refers to URL information indicating the moved location and performs retry instantaneously.

On the other hand, if the CPU 31 determines that there is no URL information indicating a moved location of print data (S202: No), the CPU 31 determines whether the status code indicates a temporary error or not (S203, an example of the reason determining section and the status-code determining section). This determination in S203 is performed by determining whether the printer 100 receives a status code of "503: Service Unavailable".

If the status code indicates a temporary error (S203: Yes), the CPU 31 sets retry such that retry is performed ten minutes later (S204, an example of the setting section) and ends the retry setting process. On the other hand, if the status code does not indicate a temporary error (S203: No), the CPU 31 sets retry such that retry is performed one hour later (S205, an example of the setting section) and ends the retry setting process.

That is, if the status code indicates a temporary error (S203: Yes), retry is so set that retry is performed in a shorter period than in a case where the status code does not indicate a temporary error (S203: No).

[Advantageous Effects of the First Embodiment]

As described above in detail, according to the printer 100 of the first embodiment, if the CPU 31 determines that the Web page is not acquired normally (S102: No), the CPU 31 stores the status code and the inputted URL information in the NVRAM 34 (S105) and executes the retry setting process (S106). And, when the retry setting process is executed, the Web-page printing process is executed again in accordance with the retry setting. Hence, if the CPU 31 determines that the Web page is not acquired normally (S102: No), the CPU 31 downloads print data corresponding to the URL information stored in the NVRAM 34, in accordance with the retry setting. Thus, the CPU 31 can acquire print data corresponding to the URL information even when it is determined that the Web page is not acquired normally.

Further, if the CPU 31 determines that there is URL information indicating a moved location of print data (S202: Yes), it does not necessarily mean that there is a problem at the Web server 300, the transmission speed, or the like. Thus, the CPU 31 sets retry such that retry is performed instantaneously (S206, an example of the setting section), and ends the retry setting process. Further, if the status code indicates a temporary error (S203: Yes), the CPU 31 sets retry such that retry is performed ten minutes later (S204, an example of the setting section) and ends the retry setting process. On the other hand, if the status code does not indicate a temporary error (S203: No), the CPU 31 sets retry such that retry is performed one hour later (S205, an example of the setting section) and ends the retry setting process. Hence, retry can be performed in an appropriate method depending on the reason of failure in acquisition of print data.

Further, a determination of whether there is URL information indicating a moved location of print data (S202) is performed by determining whether the printer 100 receives a status code of "301: Moved Permanently", "302: Found", "303: See Other", or "307: Temporary Redirect". Further, a determination of whether the status code indicates a temporary error is performed by determining whether the printer 100 receives a status code of "503: Service Unavailable". Hence, the reason of failure is determined based on the status code, and the reason of failure can be determined appropriately. Thus, it is likely that print data can be reacquired in an appropriate method depending on the reason of failure.

If the printer 100 receives a status code of "301: Moved Permanently", "302: Found", "303: See Other", or "307: Temporary Redirect", it is likely that, although the printer 100 has accessed a directory of the Web server 300 based on inputted URL information, there are no print data in the directory. In this case, the printer 100 received information from the Web server 300, and this information sometimes includes URL information indicating a moved location of the print data. If the URL information indicating the moved location of the print data is included, the printer 100 temporarily stores the URL information in the RAM 33. After that the CPU 31 accesses the directory of the moved location, and downloads the print data to the memory area of the printer 100. Hence, it is likely that print data can be reacquired based on the URL information indicating the moved location of the print data.

Further, if the status code indicates a temporary error (S203: Yes), retry is so set that retry is performed in a shorter period than in a case where the status code does not indicate a temporary error (S203: No). Hence, the printer 100 can perform retry more quickly when the status code indicates a temporary error (S203: Yes), than in a case where the status code does not indicate a temporary error (S203: No).

Second Embodiment

A second embodiment of the invention differs from the first embodiment in the retry setting process. The second embodiment includes a timing determining process in the retry setting process. The Web-page printing process of the second embodiment is the same as that of the first embodiment. In the retry setting process of the first embodiment, a period for executing retry is changed depending on the status code. In the retry setting process of the second embodiment, when a failure occurs in downloading print data due to timeout, the print data are downloaded at a predetermined transmission speed that does not cause timeout.

[Retry Setting Process]

Figure 4:
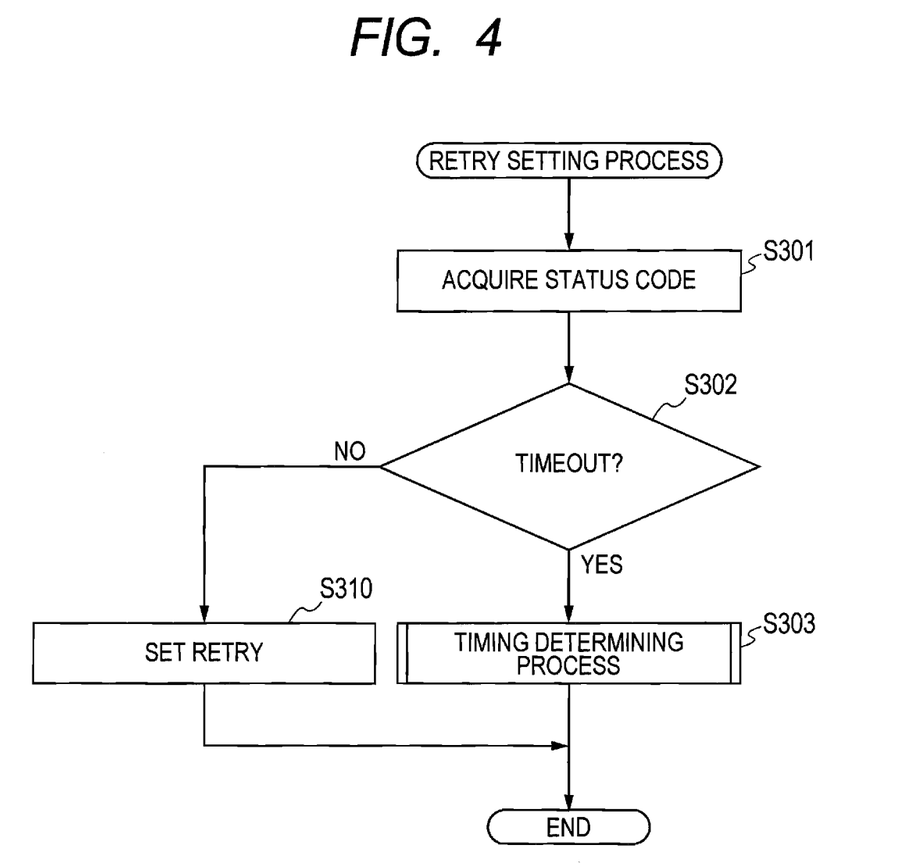
FIG. 4 is a flowchart showing steps in a retry setting process according to a second embodiment of the invention.

The retry setting process (an example of the reason determining section and the setting section) in the Web-page printing process according to the second embodiment will be described while referring to the flowchart of FIG. 4.

In the retry setting process, first, the CPU 31 acquires a status code from the NVRAM 34 (S301), and determines whether timeout has occurred or not (S302, an example of the reason determining section). This determination in S302 is performed by determining whether the printer 100 receives a status code of "408: Request Timeout".

If the CPU 31 determines that timeout has not occurred (S302: No), in S310, the CPU 31 sets retry by executing S202 and the subsequent steps in FIG. 3. Then, the CPU 31 ends the retry setting process.

On the other hand, if the CPU 31 determines that timeout has occurred (S302: Yes), the CPU 31 executes the timing determining process (S303, an example of the setting section) and ends the retry setting process.

[Timing Determining Process]

Figure 5:
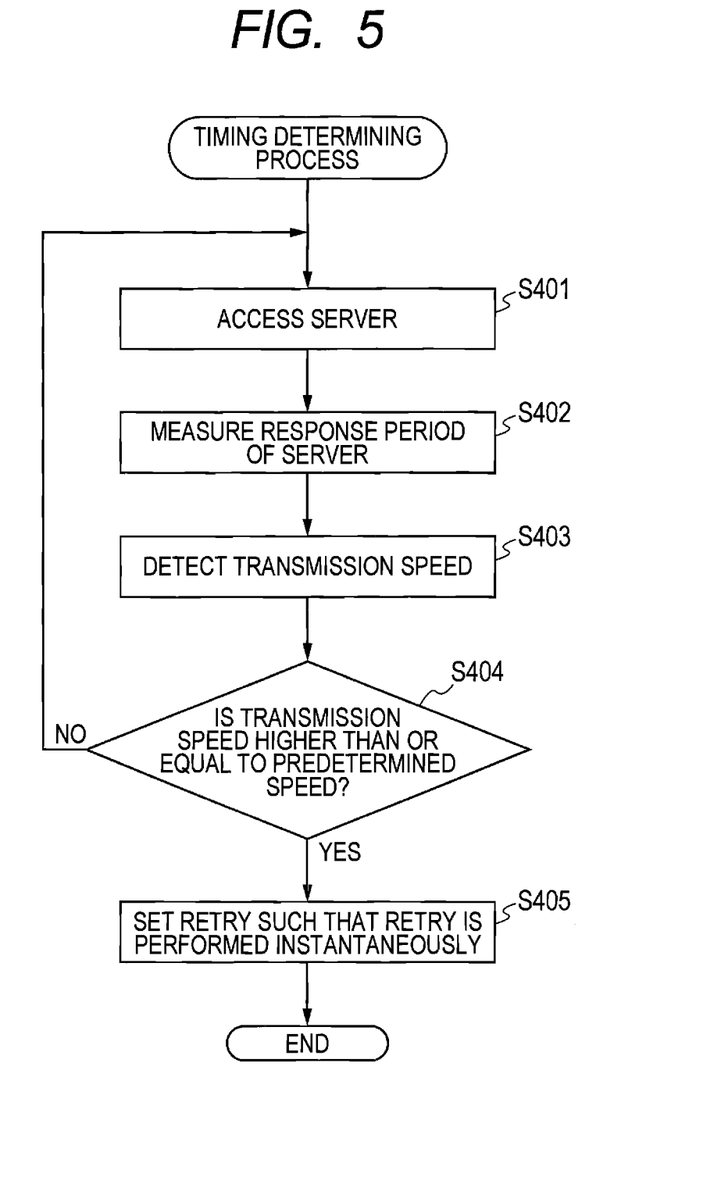
FIG. 5 is a flowchart showing steps in a timing determining process in the retry setting process of FIG. 4.

Next, the timing determining process (an example of the setting section) of S303 in the retry setting process will be described while referring to the flowchart of FIG. 5.

In the timing determining process, the CPU 31 acquires the transmission speed for data communication with the Web server 300 by executing Ping and, when the transmission speed reaches a predetermined transmission speed stored in the NVRAM 34, the CPU 31 accesses a directory of the Web server 300. Note that the predetermined transmission speed is, for example, an average value of the transmission speed when a status code of "200: OK" etc. is received.

Here, "Ping" is a diagnosis command of network using Echo Message/Echo Reply Message of a communication protocol that is used on the internet and called ICMP (Internet Control Message Protocol). When Ping is executed, an Echo request packet is transmitted to an IP address of the designated Web server 300, and the Echo request packet, as it is, is returned from the Web server 300 to the printer 100. At this time, the transmission speed can be determined based on a data amount of the Echo request packet and on a period from the transmission timing of the Echo request packet to the return timing of the Echo request packet.

In the timing determining process, first, the CPU 31 executes Ping and transmits an Echo request packet to the Web server 300, thereby accessing the Web server 300 (S401). The CPU 31 then measures a response period from timing at which an Echo request packet is transmitted to the Web server 300 to timing at which the Echo request packet is returned (S402).

Next, the CPU 31 detects the transmission speed based on the data amount of the Echo request packet and on the response period from timing at which an Echo request packet is transmitted to timing at which the Echo request packet is returned (S403, an example of a detecting section).

The CPU 31 then determines whether the transmission speed detected in S403 is higher than or equal to a predetermined transmission speed (S404, an example of a speed determining section). If the CPU 31 determines that the detected transmission speed is lower than the predetermined transmission speed (S404: No), the CPU 31 repeats the processes in S401-S403 until the detected transmission speed becomes higher than or equal to the predetermined transmission speed.

On the other hand, if the CPU 31 determines that the transmission speed detected in S403 is higher than or equal to the predetermined transmission speed (S404: Yes), the CPU 31 sets retry such that retry is executed instantaneously (S405) and ends the timing determining process.

[Advantageous Effects of the Second Embodiment]

As described above in detail, according to the printer 100 of the second embodiment, if it is determined that the detected transmission speed is higher than or equal to the predetermined transmission speed (S404:Yes), retry is so set that retry is executed instantaneously (S405) and ends the timing determining process. Hence, retry is performed when communication is not so busy, that is, when the transmission speed is higher than or equal to the predetermined transmission speed, which increases a possibility that print data can be acquired.

[Modifications]

While the invention has been described in detail with reference to the above aspects thereof, it would be apparent to those skilled in the art that various changes and modifications may be made therein without departing from the scope of the claims. In the following descriptions, like parts and components are designated by the same reference numerals to avoid duplicating description.

For example, the printing device of the invention may be a printer, a multifunction device, a copier, and any other device that has a printing function.

The image processing device of the invention may be a PC, a smart phone, a server, and the like. For example, an image processing device such as a PC may acquire print data based on URL information (S101), determine whether a Web page is acquired normally or not (S102), convert print data stored in the RAM 33 into printable-format data such as bitmap data etc. (S103), store, in the NVRAM 34, a status code stored temporarily in the RAM 33 and inputted URL information (S105), and execute the retry setting process (S106) in the Web-page printing process.

In the above-described embodiments, the CPU 31 of the printer 100 executes the Web-page printing process, the retry setting process, and the timing determining process. Nevertheless, the disclosure may not be limited to the specific embodiment thereof. For example, some steps in the Web-page printing process, the retry setting process, and the timing determining process may be executed by the printer 100, and other steps may be executed by the PC 200. In this case, the printer 100 and the PC 200, in combination, constitute an example of an image processing system.

Further, in the above-described embodiments, a single CPU performs all of the processes. Nevertheless, the disclosure may not be limited to the specific embodiment thereof, and a plurality of CPUs, a special application specific integrated circuit ("ASIC"), or a combination of a CPU and an ASIC may be used to perform the processes.

In the above-described embodiments, printing of a print job stored in the printer is started in accordance with operations on the operation panel 40. Nevertheless, the disclosure may not be limited to the specific embodiment thereof. For example, printing may be started in accordance with a print instruction from a mobile device, authentication using a card reader, or the like.

In the above-described embodiments, URL information of a Web page is inputted on the printer 100. Nevertheless, the disclosure may not be limited to the specific embodiment thereof. For example, URL information of a Web page may be inputted on the PC 200, and the URL information of the Web page may be transmitted from the PC 200 to the printer 100. Further, a device for transmitting URL information of a Web page to the printer is not limited to a PC, but may be a mobile device such as a smart phone etc., for example. Further, a portable storage medium such as a USB storage device etc. may store URL information, and the printer 100 may read out the URL information from the USB storage device.

In the above-described embodiments, status codes 3XX and 4XX are used for describing status codes that are obtained when print data are not downloaded normally. However, status codes 2XX other than 200 and 206 may be used. For example, when a status code 2XX other than 200 and 206 is received, it is not an error that is generated when an access is made to a directory of the Web server 300 based on URL information, and hence the Web-page printing process may be ended.

In the above-described embodiments, an access is made to a directory of the Web server 300 based on URL information instantaneously, ten minutes later, or one hour later, depending on the status code. However, timing (time interval) of making an access may be changed by increasing or decreasing a cycle to access the predetermined directory of the Web server 300 periodically.

In the above-described embodiments, when a failure occurs in acquisition of a Web page, URL information is read out from the RAM 33 and is stored in the NVRAM 34 in a non-volatile state (S105). Nevertheless, the disclosure may not be limited to the specific embodiment thereof, as long as URL information is memorized (stored) after a failure occurs in acquisition of a Web page and until retry is completed. For example, URL information may be continuously stored in a temporary storage section such as the RAM 33 etc. after the URL information is inputted and until retry is completed. Further, URL information may be stored in a flash memory mounted on the USB interface 38, for example.

In the above-described embodiments, the predetermined transmission speed is preliminarily stored in the NVRAM 34. However, the CPU 31 may acquire the data amount of print data, and set the predetermined transmission speed to higher values as the data amount of print data is larger. In this modification, the NVRAM 34 stores a table including the data amounts of print data in correspondence with the transmission speeds. For example, in case of a HTML file, after downloading a source text, the CPU 31 analyzes the source text and determines the data amount of image data linked with the HTML. Then, the CPU 31 obtains the transmission speed corresponding to the data amount of image data from the table, and determines whether the current transmission speed is higher than the transmission speed that is obtained from the table. If the current transmission speed is higher than the transmission speed that is obtained from the table, the CPU 31 downloads print data to the memory area of the printer 100.

In the above-described embodiments, in S102, the CPU 31 determines that the Web page is acquired normally when a status code of "200: OK" or "206: Partial Content" is received (S102: Yes). Nevertheless, the disclosure may not be limited to the specific embodiment thereof. For example, the CPU 31 may determine that the Web page is not acquired normally (S102: No) when print data is still in the middle of downloading, or when the printer 100 receives a status code of "301: Moved Permanently", "302: Found", "303: See Other", "307: Temporary Redirect", "403: Forbidden", or "404: Not Found".

In the retry setting process of the second embodiment, the CPU 31 determines whether timeout has occurred or not (S302) by determining whether the printer 100 receives a status code of "408: Request Timeout". Nevertheless, the disclosure may not be limited to the specific embodiment thereof. For example, when an access is made to a Web page of a reference location included in URL information, the CPU 31 may activate the timer 35 and may determine that timeout has occurred if a status code of "200: OK" or "206: Partial Content" is not received within a predetermined period. With this modification, a determination can be made accurately whether shortness of time is the reason of failure.

Figure 3:
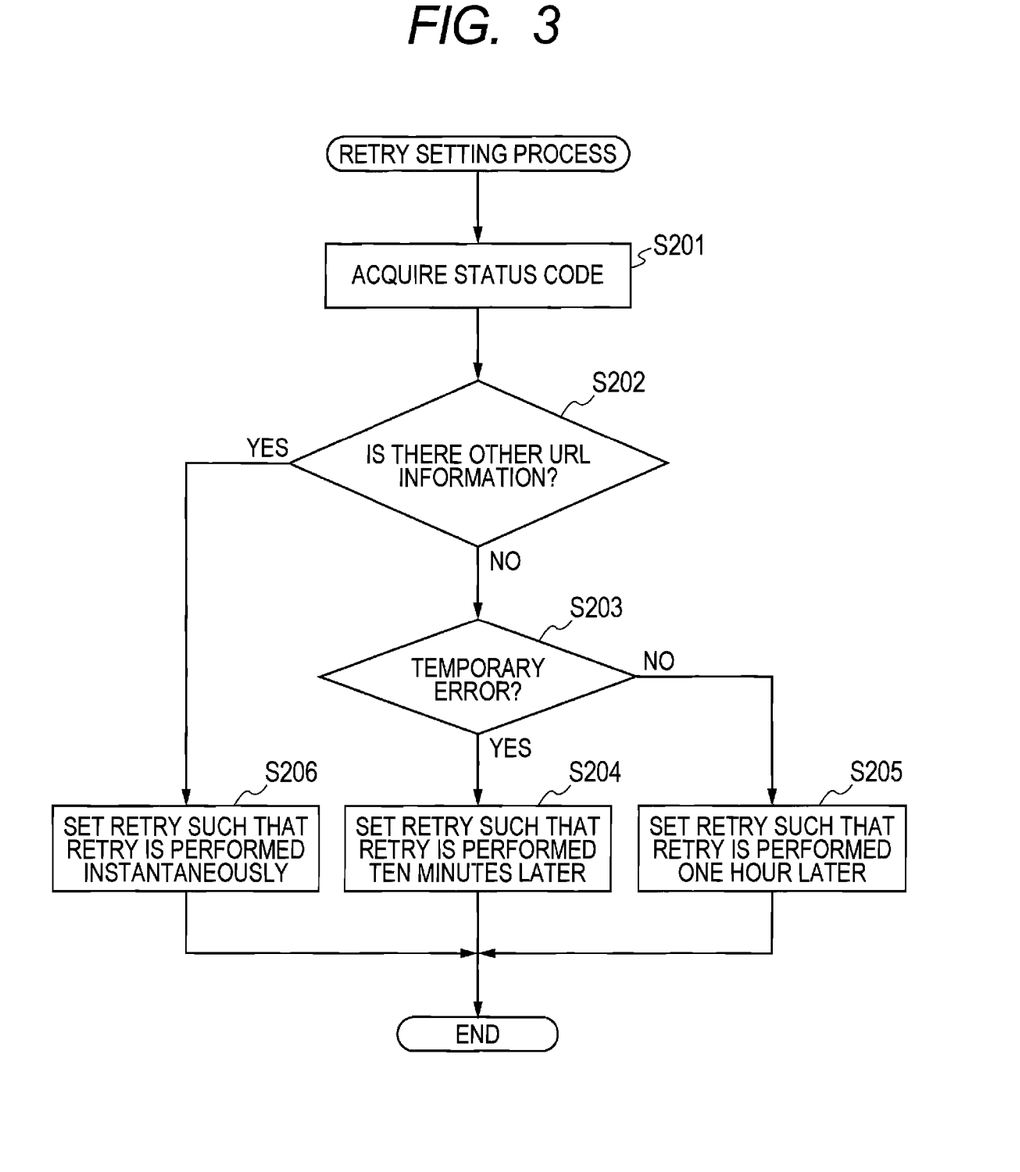
FIG. 3 is a flowchart showing steps in a retry setting process in the Web-page printing process.
Figure 6:
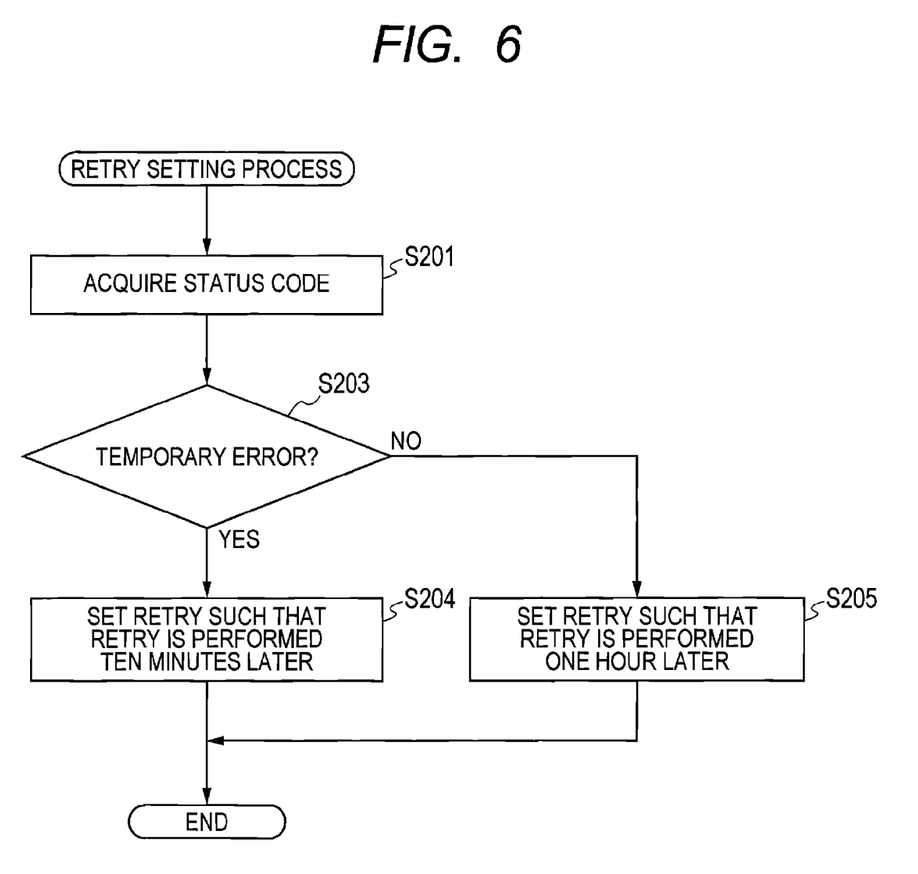
FIG. 6 is a flowchart showing steps in a retry setting process according to a modification.

As shown in FIG. 6, the steps of S202 and S206 may be omitted in the retry setting process shown in FIG. 3. In this modification, after the CPU 31 acquires a status code from the NVRAM 34 (S201), the CPU 31 determines whether the status code indicates a temporary error or not (S203). The CPU 31 sets retry such that retry is performed ten minutes later (S204) if the status code indicates a temporary error (S203: Yes), and sets retry such that retry is performed one hour later (S205) if the status code does not indicate a temporary error (S203: No). Then, the retry setting process ends.

Figure 7:
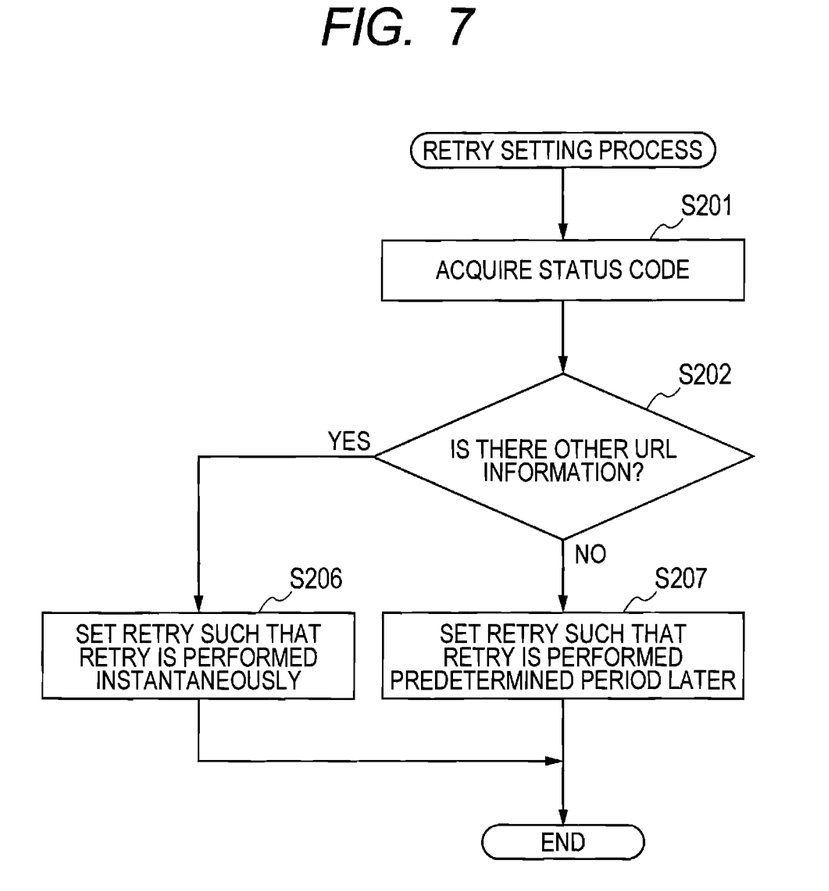
FIG. 7 is a flowchart showing steps in a retry setting process according to another modification.

Further, as shown in FIG. 7, the steps of S203 and S205 may be omitted in the retry setting process shown in FIG. 3. In this modification, the CPU 31 acquires a status code from the NVRAM 34 (S201), and determines whether there is URL information indicating a moved location of print data or not (S202). If the CPU 31 determines that there is URL information indicating a moved location of print data (S202: Yes), the CPU 31 refers to the URL information indicating the moved location and sets retry such that retry is performed instantaneously (S206), and ends the retry setting process. If the CPU 31 determines that there is no URL information indicating a moved location of print data (S202: No), the CPU 31 sets retry such that retry is performed a predetermined period later (for example, 20 minutes later) (S207) and ends the retry setting process.

What is claimed is:

1. An image processing device comprising:
an image forming section configured to form an image on a sheet;
a processor;
a network interface connectable to a network;
a receiving unit;
a first memory;
a second memory separate from the first memory; and
a third memory storing instructions, the instructions, when executed by the processor, causing the processor to perform:
receiving reference information indicative of a reference location on the network by the receiving unit;
storing the reference information received by the receiving unit in the first memory;
acquiring data and a status code through the network interface based on the reference information stored in the first memory;
after acquiring the status code, determining whether the acquired status code is a first status code that is obtained when acquisition of the data is performed normally;
when it is determined that the acquired status code is the first status code, controlling the image forming section to form an image based on the acquired data on a sheet;
when it is determined that the acquired status code is other than the first status code, storing the reference information in the second memory;
after storing the reference information in the second memory, determining whether the acquired status code is a second status code that indicates a temporary error;
when it is determined that the acquired status code is the second status code, reacquiring the data based on the reference information in the second memory in a first period; and
when it is determined that the acquired status code is other than the second status code, reacquiring the data based on the reference information in the second memory in a second period, the second period being longer than the first period.

2. The image processing device according to claim 1, wherein, when executed by the processor, the instructions further cause the processor to perform:
determining a reason why acquisition of the data fails; and
setting a method in which the data are reacquired based on the reason;
wherein the instructions for reacquiring data comprise reacquiring the data with the method.

3. The image processing device according to claim 2, wherein, when executed by the processor, the instructions further cause the processor to perform:
receiving a status code; and
determining whether the received status code matches a predetermined status code;
wherein the instructions for determining a reason comprise, when the received status code matches the predetermined status code, determining that an error corresponding to the status code is the reason why acquisition of the data fails.

4. The image processing device according to claim 3, wherein the instructions for setting a method comprise, when the received status code matches a status code including other reference information, setting the method in such a manner that data corresponding to the other reference information are reacquired.

5. The image processing device according to claim 4, wherein the instructions for setting a method comprise setting the method in such a manner that the data corresponding to the other reference information are reacquired instantaneously.

6. The image processing device according to claim 2, further comprising a timer configured to measure time,
wherein the instructions for determining a reason comprise determining that the reason of failure is shortness of time when the time measured by the timer is longer than or equal to a predetermined period.

7. The image processing device according to claim 3, wherein the instructions further cause the processor to perform:
determining that the reason of failure is shortness of time when the received status code is a status code indicative of timeout.

8. The image processing device according to claim 1, wherein, when executed by the processor, the instructions further cause the processor to perform:
detecting a transmission speed of acquiring the data; and
determining whether the detected transmission speed is higher than or equal to a predetermined transmission speed; and
wherein the instructions for reacquiring data comprise reacquiring the data when the detected transmission speed is higher than or equal to the predetermined transmission speed.

9. The image processing device according to claim 8, wherein, when executed by the processor, the instructions further cause the processor to perform:
transmitting a request packet to the reference location, to measure a response period from timing at which the request packet is transmitted to the reference location to timing at which the request packet is returned; and
detecting the transmission speed based on a data amount of the request packet and on the response period.

10. The image processing device according to claim 1, further comprising an image forming section configured to print either the data acquired in the instructions for acquiring data or the data reacquired in the instructions for reacquiring data.

11. The image processing device according to claim 1, wherein the reference information is inputted via an input screen for prompting a user to input the reference information.

12. The image processing device according to claim 1, wherein the first status code is any one of "200:OK" and "206: Partial Content"; and
wherein the second status code is "503: Service Unavailable".

13. An image processing system comprising:
an image processing apparatus; and
a web server configured to send data and a status code to the image processing apparatus in response to receiving a request for acquiring the data and the status code,
wherein the image processing apparatus comprises:
an image forming section configured to form an image on a sheet;
a processor;
a network interface connectable to a network;
a receiving unit;
a first memory;
a second memory separate from the first memory; and
a third memory storing instructions, the instructions, when executed by the processor, causing the processor to perform:
receiving a reference information indicative of a reference location of the web server on the network by the receiving unit;
storing the reference information received by the receiving unit in the first memory:
acquiring data and a status code from the web server through the network interface based on the reference information stored in the first memory;
after acquiring the status code, determining whether the acquired status code is a first status code that is obtained when acquisition of the data is performed normally;
when it is determined that the acquired status code is the first status code, controlling the image forming section to form an image based on the acquired data on a sheet;
when it is determined that the acquired status code is other than the first status code, storing the reference information in the second memory;
after storing the reference information in the second memory, determining whether the acquired status code is a second status code that indicates a temporary error;
when it is determined that the acquired status code is the second status code, reacquiring the data from the web server based on the reference information in the second memory in a first period; and
when it is determined that the acquired status code is other than the second status code, reacquiring the data from the web server based on the reference information in the second memory in a second period, the second period being longer than the first period.

14. The image processing system according to claim 13, wherein the first status code is any one of "200:OK" and "206: Partial Content"; and
wherein the second status code is "503: Service Unavailable".

* * * * *